United States Patent [19]

Alvino et al.

[11] Patent Number: 4,474,658

[45] Date of Patent: Oct. 2, 1984

[54] METHOD OF PREPARING ELECTROPHORETTABLE POLYMER EMULSIONS

[75] Inventors: William M. Alvino, Penn Hills; Timothy J. Fuller, Pittsburgh, both of Pa.

[73] Assignee: Westinghouse Electric Corp., Pittsburgh, Pa.

[21] Appl. No.: 533,025

[22] Filed: Sep. 16, 1983

Related U.S. Application Data

[62] Division of Ser. No. 342,029, Jan. 21, 1982, Pat. No. 4,425,467.

[51] Int. Cl.³ .............................................. C25D 13/06
[52] U.S. Cl. ............................ 204/181 C; 204/181 R; 524/901
[58] Field of Search ....................... 204/181 C, 181 R; 524/600, 901, 606, 609; 252/500; 525/419, 420, 535, 906

[56] References Cited

U.S. PATENT DOCUMENTS

| | | | |
|---|---|---|---|
| 3,943,065 | 3/1976 | Phillips | 252/500 |
| 4,003,812 | 1/1977 | Scala et al. | 204/181 |
| 4,019,877 | 4/1977 | Gass et al. | 428/626 |
| 4,053,444 | 10/1977 | Phillips | 260/30.2 |

*Primary Examiner*—Theodore E. Pertilla
*Attorney, Agent, or Firm*—R. D. Fuerle

[57] ABSTRACT

Disclosed is a method of making a non-aqueous emulsion from which a polymer can be electrodeposited. A mixture is prepared of about 50 to about 150 parts by weight of a non-aqueous organic, non-electrolizable, non-solvent for the polymer with about 0.8 to about 1.2 parts by weight of a nitrogen-containing base which can be a tertiary amine, an imidazole, or mixture of a tertiary amine and an imidazole. To the mixture is added a solution of 1 part by weight of the polymer which can be a polyamic acid, a polyamide imide, a polyimide, a polyparabanic acid, a polysulfone, or a mixture of these polymers. The polymer is in a non-aqueous, organic, non-electrolizable aprotic solvent such as N-methyl-2-pyrrolidone.

3 Claims, No Drawings

METHOD OF PREPARING ELECTROPHORETTABLE POLYMER EMULSIONS

This is a division of application Ser. No. 342,029, filed Jan. 21, 1982, now U.S. Pat. No. 4,425,467 issued Jan. 10, 1984.

BACKGROUND OF THE INVENTION

When a direct current potential is applied across a liquid medium containing charged particles, the particles migrate towards the electrode bearing the opposite charge and deposit thereon. This process is called electrophoretic deposition and is utilized to apply coatings to conductive surfaces for electrical insulation, paint priming, and other purposes.

Electrophoretic deposition from non-aqueous media is accomplished using polymeric emulsions. The composition and formation of these emulsions critically affect the emulsion stability, the particle size of the emulsion droplets, and ultimately, the quality and quantity of the deposited coating. Until now, these polymeric emulsions have been prepared by reacting an organic amine with a polymer in a solution to form an amine salt. The solution was then dispersed in a non-solvent which formed the emulsion. The formation of the salt was believed to be necessary because it was thought that the polymer would not migrate to the electrode unless a charge was placed on it. It was also thought that the reaction of the amine with the polymer to form the salt required heating the amine with the polymer, and that this could not be done efficiently in the presence of the non-solvent. While good emulsions were obtained, results were not totally satisfactory because large polymeric particles precipitated and the size of the particles remaining in the emulsion were generally larger than was desirable for long-term stability and coating uniformity.

SUMMARY OF THE INVENTION

We have found that it is not necessary to react the amine with the polymer prior to adding the polymer to the non-solvent. In fact, surprisingly, we have found that adding a solution of the polymer to a non-solvent containing the amine produces an emulsion that is finer in particle size and has an improved long-term stability and deposition yield. That is, the emulsion of this invention has less tendency to break on storage, the coulombic yield and the physical yield per unit time are higher, and a smoother coating is produced because the particle size is smaller.

PRIOR ART

U.S. Pat. Nos. 4,053,444; 4,003,812 and 3,943,065 disclose reacting a polymer with a nitrogen-containing base to form a salt which is then added to a non-solvent to form an electrophorettable emulsion.

U.S. Pat. No. 4,019,877 discloses mixing a surfactant with a polymer solution and adding that mixture to a non-solvent to form an electrophorettable emulsion of polyimides.

DESCRIPTION OF THE INVENTION

The polymers which can be electrodeposited using the process of this invention include polyamic acids, polyamide-imides, polyimides, polyparabanic acids, polysulfones, and mixtures thereof. Polyimides are the preferred polymer because they work very well and are commercially important. Detailed structure of various suitable polyimides can be found in U.S. Pat. No. 4,053,444, herein incorporated by reference.

A solution is prepared of the polymer with a nonaqueous, organic, non-electrolizable, aprotic solvent. Suitable solvents include the normally liquid organic solvents of the N,N-dialkylcarboxyamide class, preferably the lower molecular weight members of this class, such as dimethyl acetamide, dimethyl formamide, and N-methyl-2-pyrrolidone. Other suitable solvents include dimethyl sulfoxide and pyridine. The solvents can be used individually or in combinations of two or more. The solvents should be easily removable by heating in a drying tower or oven. The preferred solvent is N-methyl-2-pyrrolidone because it can be used with almost all of the above polymers. The solid content of the polymer solution should be about 0.5 to about 5.0 weight percent based on the total weight of the polymer in the solvent.

In the practice of this invention a mixture is prepared of about 50 to 150 parts by weight of a nonaqueous organic, non-electrolizable, non-solvent for the polymer with about 0.8 to about 1.2 parts by weight of a nitrogen-containing base. The non-solvent for the polymer must not gas to any great extent at the electrodes due to electrolysis when a voltage is applied between them. Preferred non-solvents include nitroalkanes, acetonitrile, liquid aliphatic (straight and branched chain) and aromatic ketones, such as, for example, acetone, methyl isobutyl ketone, methyl ethyl ketone, methyl n-propyl ketone, diethyl ketone, mesityl oxide, cyclohexanone, methyl n-butyl ketone, ethyl n-butyl ketone, methyl n-amyl ketone, acetophenone, methyl n-hexylketone, isophorone, and diisobutylketone. The preferred ketone is acetone because it can be used with almost all polymer systems. Suitable nitrogen-containing bases include organic aliphatic and aromatic amines. Tertiary amines are preferred because they then provide a more stable emulsion and a higher electrodeposit yield. Examples of suitable nitrogen-containing bases include trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmoropholine, N,N-diethylaniline, and pyridine. Imidazoles such as, for example, imidiazole itself, 1-methylimidazole, 4-methylimidazole, 5-methylimidazole, 1-propylimidazole, 1,2-dimethylimidazole, 1-ethyl-2-methylimidazole, and 1-phenylimidazole can also be used, either alone or mixed with a tertiary amine. The preferred nitrogen-containing base is triethylamine because it provides stable emulsions with a high electrodeposit yield.

The electrodeposition composition is formed by adding the polymer solution to the solution of the non-solvent and the nitrogen base. The electrodeposition composition should contain about 1 part (by weight) of the polymer, about 29 to about 37 parts of solvent, about 0.8 to about 1.2 parts of nitrogen-containing base, and about 50 to about 150 parts of the non-solvent. If less than 29 parts of solvent are used, the viscosity will be too high and precipitation of the polymer may occur, and if more than 37 parts of solvent are used, the polymer may stay in solution and not coat on the electrode. If less than 50 parts of the non-solvent are used, electrocoating may also be inhibited because the polymer may stay in solution, and if more than 150 parts of non-solvent are used, the polymer may precipitate. The electrodeposition composition can be used in the same manner as prior electrodeposition compositions. (See U.S. Pat. Nos. 4,053,444; 3,943,065; and 4,019,877, herein incorporated by reference). Small amounts of filler particles or finely divided pigments or lubricants can be added to the composition if desired.

The following examples further illustrate this invention:

EXAMPLE 1

Two emulsions were prepared using a polyamic-acid material as a 15 wt.% solution in N-methyl pyrrolidone (NMP) which was sold by the DuPont Co. under the trade designation "Pyre ML-RC5057." In emulsion A the amine and the Pyre ML were heated for 20 minutes at 40° C. prior to adding it to acetone. In emulsion B the polymer solution was added to the acetone which contained the amine. The composition of the emulsions was 10 g Pyre ML, 62 g NMP, 0.4 g triethylamine ($Et_3N$) and 178 ml of acetone.

Emulsion A had a white opaque color and some fibrous polymeric precipitate on the bottom of the beaker. Emulsion B was semi-transparent and slightly turbid with no precipitated polymer. These emulsions were electrolyzed at 50 Vdc to 60 seconds using alumium electrodes 1½" wide and immersed 2" with 1" separation. The yield of deposit for emulsion A was 31 mg and the yield on the anode of emulsion B was 36 mg. The coulombic yield for emulsion A was 63 mg/coulomb and the coulombic yield for emulsion B was 72 mg/coulomb. Samples of the emulsions were covered and left to stand at room temperature for 2 months. While no precipitate formed in emulsion B the precipitate which formed in emulsion A was about 10% of the total weight of the polymer.

EXAMPLE 2

Two emulsions were prepared using a 20 wt.% solution in dimethyl formamide (DMF) of a polyparabanic acid polymer sold by Exxon Chemicals under the trade designation "PPA-M." These emulsions were prepared in the same manner as emulsions A and B in Example 1. The emulsions contained 5 g PPA-M, 39 g dimethyl formamide, 0.36 g triethylamine, and 120 ml of acetone. Emulsion A was an opaque-white color with a polymer precipitate that constituted about 20% of the total polymer weight. Emulsion B had a deep white color with no large precipitated particles. The emulsions were electrolyzed at 100 Vdc using aluminum electrodes as in Example 1. The yield of deposit for emulsion A was 20 mg and the yield for emulsion B was 36 mg. The coulombic yield for emulsion A was 7 mg/coulomb and the coulombic yield for emulsion B was 37 mg/coulomb.

EXAMPLE 3

Two emulsions were prepared using a powder of polyphenyl sulfone sold by Union Carbide Corporation under the trade designation "Radel-5000." The emulsions were prepared in the same manner as emulsions A and B in Example 1. The composition of these emulsions was 1.38 g Radel-5000, 58.6 g NMP, 0.69 g $Et_3N$, and 148 ml of acetone. Both emulsions were opaque and white in color. The emulsions were electrolyzed as in Example 1. The yield of emulsion A was 4 mg and the yield of emulsion B was 21 mg.

I claim:

1. A method of coating a substrate comprising electrophoretically depositing a polymer onto a substrate from a composition made by
    (A) preparing a mixture about 50 to about 150 parts by weight of a non-aqueous organic non-electrolizable non-solvent for said polymer with about 0.8 to about 1.2 parts by weight of a nitrogen-containing base, selected from the group consisting of tertiary amines, imidazoles, and mixtures thereof,
    (B) adding to said mixture a solution of about 0.5 to about 5% solids containing 1 part by weight of said polymer, said polymer being selected from the group consisting of polyamic acids, polyamide-imides, polyimides, polyparabanic acids, polysulfones, and mixtures thereof, in a non-aqueous, organic, non-electrolizable aprotic solvent.

2. A method of claim 1 wherein said substrate is a metal.

3. A method according to claim 1 including the additional last step of curing said polymer, on said substrate.

* * * * *